United States Patent [19]

Thomasson

[11] Patent Number: 4,509,376

[45] Date of Patent: Apr. 9, 1985

[54] SAFE LOAD INDICATOR

[75] Inventor: William R. Thomasson, Houghton-le-Spring, England

[73] Assignee: Coles Cranes Limited, Sunderland, England

[21] Appl. No.: 423,366

[22] Filed: Sep. 24, 1982

Related U.S. Application Data

[62] Division of Ser. No. 149,376, May 13, 1980, Pat. No. 4,368,824.

[30] Foreign Application Priority Data

May 18, 1979 [GB] United Kingdom ................ 7817405

[51] Int. Cl.[3] ............................................... G01L 5/04

[52] U.S. Cl. .............................. 73/862.56; 73/862.45; 177/147; 340/685

[58] Field of Search ........... 73/862.45, 862.47, 862.48, 73/862.56; 212/158; 177/147; 340/668, 685, 672; 324/165

[56] References Cited

U.S. PATENT DOCUMENTS 3,244,243 4/1966 Fielder .......................... 177/147 X
3,310,981 3/1967 Nixon et al. ..................... 73/862.45
4,052,602 10/1977 Horn et al. ...................... 340/685 X
4,142,152 2/1979 Fincher .......................... 340/672 X
4,212,006 7/1980 Cakebread et al. ................ 340/685

*Primary Examiner*—Charles A. Ruehl
*Attorney, Agent, or Firm*—Townsend and Townsend

[57] ABSTRACT

A dynamometer, used to measure the tension on, speed of, and direction of movement of a hoist rope on a crane, includes a frame comprising three spaced apart blocks coupled to one another by pairs of thin flexible resilient portions. Two pulleys are mounted to the outermost blocks while an offset pulley, coupled to a tension monitoring load cell, is mounted to the central block and presses against the rope. One pulley has three permanent magnets imbedded about its periphery, two being axially spaced across from one another and the third being spaced radially 180° from the others. Sensors mounted to the frame are positioned to sense the passing of the magnets to provide rope speed and direction of travel information in digital form. Tension information from the load cell and speed and direction information from the sensors are supplied to a microprocessor for processing.

11 Claims, 7 Drawing Figures

SAFE LOAD INDICATOR

This is a division of application Ser. No. 149,376, filed May 13, 1980, now U.S. Pat. No. 4,368,824.

The present invention relates to a crane having a data processing system.

In existing systems the load on the crane jib is used as one of the parameters or variables for the calculation or determination of actual crane radius. Crane radius is normally indicated in safe load indicators (hereafter abbreviated S.L.I's) and is used to determine actual working load (hereafter abbreviated A.W.L.) and safe working load (hereafter abbreviated S.W.L.). Because load is used as a parameter, the crane calculating system has to be calibrated for specific loads, any slight change of the boom stiffness on cranes of the same type will require a new and different calibration which is expensive, time consuming, crude and subject to error.

Known S.L.I's for cranes have taken into account various variables in crane use, such as jib angle, jib length, crane configuration, slew angle, hoist load and numbers of falls. These variables will hereafter be referred to as crane variables.

Because of the number of variables it has been common practice to measure say hoist load (that is done by several means, one of which is by measuring hoist rope tension by a suitable dynamometer) and jib angle and correlate these variables by means of a cam cut for a particular jib length and crane configuration, the cam being shaped to correspond in proportional manner to a table giving permissible capacity for that length of jib. When a different configuration or jib length is applicable the cam must be changed, and this is troublesome and can be subject to further error. For instance as a load is applied to a jib which is between calibrated positions, the precise working load is determined by the shaping of the cam and this is open to error and lack of consistency between similar machines. Furthermore the cutting of specific cams for each configuration is tedious. With a view to reducing these problems, the variables and cam forms have been represented as electrical resistances and these are compared to detect whether a danger situation exists. Each variable is usually represented on a dial on a main indicator. These systems being in effect analogue computers are inflexible in so far as each variable has to be carefully calibrated and represented by a particular circuit. Therefore changing factors may require a completely new circuit.

According to the present invention a crane has a data processing system comprising means for determining the base angle of the crane jib and the angular deflection of the crane jib head, means for measuring the length from jib base to jib head, the determining means and measuring means being enabled to transmit digital data corresponding to the angular deflection and length determined and measured respectively and a microprocessor arranged to receive signals transmitting such data, to process the data so as to determine mathematically the true deflected form of the crane jib. Actual jib radius may thereby be determined since the actual jib head and base positions are known.

Preferably the microprocessor is connected to a display which is arranged to display A.W.L. and S.W.L. and other data processed by the microprocessor, the display forming a safe load indicator. The microprocessor can be suitably arranged to trigger audible and/or visible alarms and to cut motion when a safe working load is approached or exceeded.

In order to determine a specific load a dynamometer is used.

By using a microprocessor and data inputs, it will be clear that not only can a multiplicity of data be fed into the calculation as to whether a specific load is safe under a certain condition but the number of inputs can be unlimited.

A further advantage is that if equipment is updated it is possible to amend the calculations by reprogramming the microprocessor instead of recutting cams, renewing circuitry or changing permissible duty charts due to change of configurations, that is change to a fly jib or different lattice booms.

The system is able to calculate the actual radius being the apparent radius modified by a specific load. Therefore the safe load indicator is always presented with correct data regarding actual radius at any position and is therefore constantly kept informed of the true safe working situation.

A further advantage not available hitherto is that the same microprocessor can be used for data not specifically related to load, such as tyre pressure, running hours of machinery, time before next maintenance or even maintenance data. No additional hardware is required but only programming.

Thus it will be appreciated that an operator need only refer to one display which can present any information required in an alphanumeric form. A simple analogue display could be incorporated in the form of asterisks with display indicating round numbers or tonnes actual working load and safe working load.

An additional advantage is that when a crane is unloaded but the jib is at a low elevation, provision can simply be made to warn the operator when the jib enters a dangerously low angle that is within the geometric spectrum of the crane but outside the load spectrum.

A still further advantage is that if safety regulations are altered or if the operator moves from one country to another with different safety regulations, these can easily be programmed into the microprocessor without physically altering the indicator, that is changing cams or circuits.

In the event of an automatic luffing or stowing facility being required it is simple to use the data processed by the microprocessor of the system to control servo operated motions for jib length, rope length, jib elevation and slew or height of load.

One embodiment of the invention will now be described in detail, by way of example, with reference to the accompanying drawings in which.

Figure 1:
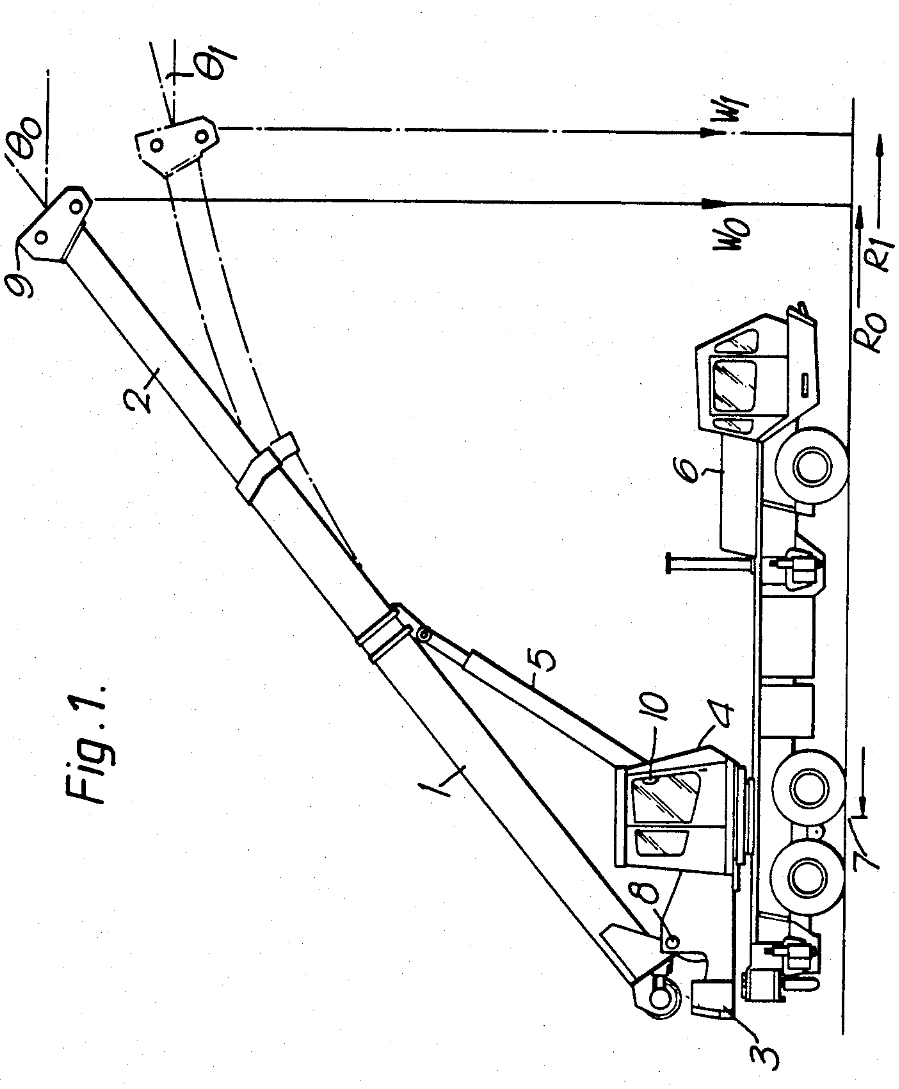
FIG. 1 is an elevation of a vehicle mounted crane incorporating the invention.

The crane shown in the drawing FIG. 1 is one of several suitably provided with a data processing system according to the invention. The crane comprises a telescopic jib lower section 1, one or more extending upper sections 2 with the possibility of a fly jib or other load bearing structure to be fitted thereto, a crane superstructure 3 on which is mounted a cab 4, elevating means 5 (suitably a ram) for elevating the jib, and a vehicle chassis 6. The crane superstructure 3 is mounted to the vehicle 6 so that it can rotate about axis 7.

In a no load state the crane jib head 9 is at an elevation $\theta_o$ which approximately (self weight causing a slight differential) equals that at the crane foot or jib base and can be measured by a suitable detector either close to the jib pivot 8 at the jib base or else in the elevating means 5. In a loaded state represented in considerable over distortion by the broken lines in FIG. 1 the jib head is at an elevation θhd 1. The angle $\theta_1$ can be measured by a suitable detector at the head of the boom, other detectors being located at the jib base close to the jib pivot and along the length of the jib (if required) being used to establish the formed shape of the jib. The length of the jib from pivot 8 to head 9 can be measured by suitable means such as a cable running from the jib head to a spring loaded drum at the jib base. The drum is connected to a known digital transmitter. The cable besides measuring jib length is used to power an upper inclinometer 21 (FIG. 2) at the jib head which detects angle $\theta_1$. Signals from the inclinometer 21 are passed down the cable. The no load radius $R_o$ can then be calculated by a microprocessor provided in the crane and displayed on display 10 mounted in cab 4 and fed with data from the detectors. In the loaded stage the downward deflection of the jib causes the angle of the jib head to reduce to $\theta_1$; also the radius of the jib will increase to $R_1$. Both the deflection and radius are easily indicated digitally on the display 10. Whilst the deflection of the jib has per se a safe limit the increase in radius affects the tendency of the crane to tipping and therefore increase in radius which itself is a variable must be used to modify the load limit for a given radius $R_o$. The reduction of crane variables such as these to digital data clearly ensure the accuracy and effectiveness of the data. On or before reaching any safe limit the microprocessor causes an alarm to sound on an audio alarm 24 and/or a visual alarm on display 10 and a motion cut relay 26 can be made to operate to prevent entering an unsafe condition.

Figure 2:
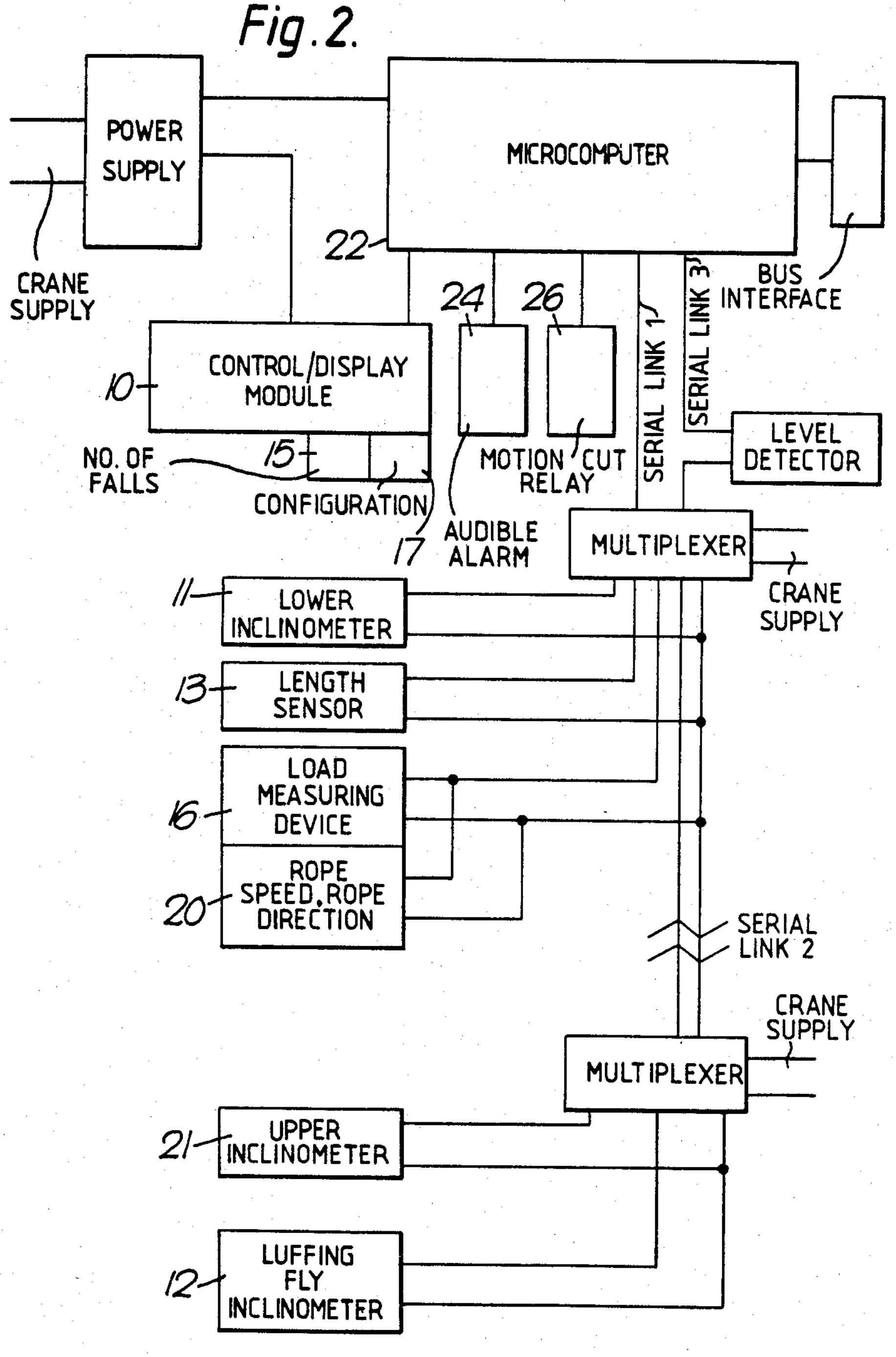
FIG. 2 is a block diagram of a crane data processing system including a safe load indicator according to the invention.
Figure 3:
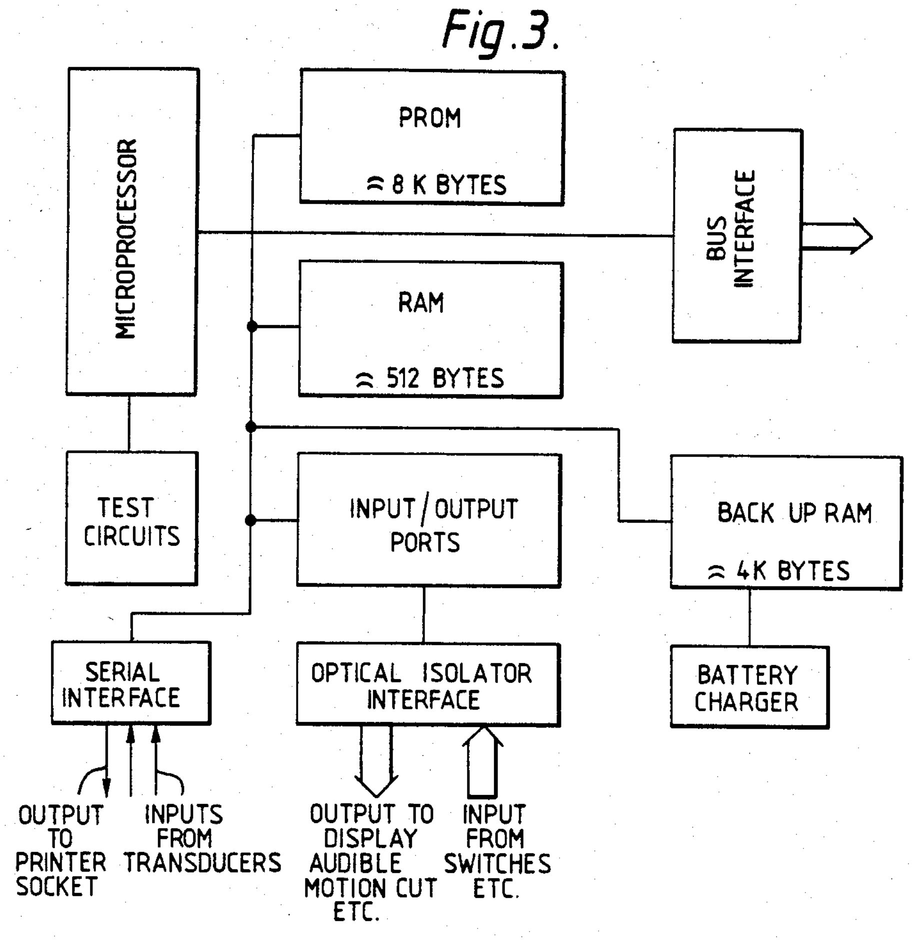
FIG. 3 is a block diagram of details of the microprocessor for the system of FIG. 2.
Figure 4:
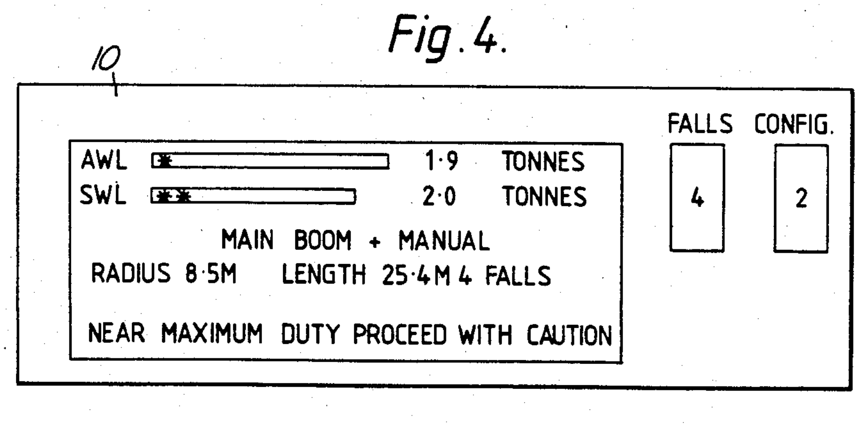
FIG. 4 is a diagram of a display used in the system of FIG. 2.

In FIG. 2 the crane data system is diagrammatically shown in which detectors and controls 11 to 21 feed various crane variables to the microprocessor 22 and this feeds in digital form treated data to display 10.

Although not shown, it is convenient to use the display 10 for other information such as tyre pressures and engine running hours. Also it could be convenient to use the microprocessor to cause the display to indicate maintenance periods for the whole unit. Thus not only does the invention provide for more accurate processing and display of data, but other data not part of a normal safe load indicator can be stored and displayed.

Although many of the digital transmitters used to transmit data to the microprocessor 22 are known devices certain of these are designed specially for use in the present system. In particular the load measuring device 16 and rope speed and direction transmitter 20 are believed to be novel and are combined in a single detector unit 30 shown in FIGS. 5 to 7.

In the detector 30 which is mounted on the jib between jib head and base there are essentially three rollers or pulleys 31, 32 and 33. Pulleys 31 and 33 lie in line in or parallel to the crane rope 35 and the centre pulley 32 is offset from the line so that it bears against the rope. Pulleys 31 and 33 act as lead means which guide rope 35 on either side of offset pulley 32. Any change of rope tension, that is change of load from $W_0$ to $W_1$ causes a tendency for pulley 32 to deflect and this tendency can be meaured by a load cell 40. It will be seen in FIG. 5 that each pulley 31 to 33 is mounted respectively in blocks 37 to 39 and each block is connected by thin substantially flexible resilient portions 36 which form part of the same integral member as the blocks 37 to 39 and is formed of an elastomer material such as nylon or Novatron (Registered Trade Mark) a material supplied by Polypenco Ltd. of Welwyn Garden City, England. The thin portions 36 allow centre block 38 to deflect under load with respect to blocks 37 and 39 but have the tendency to reduce any forces acting on the load cell 40 due to friction under motion between rope 35 and pulley 32. Blocks 37, 38 and 39 plus portions 36 comprise a frame to which rollers 31, 32 and 33 are mounted.

Figure 5:
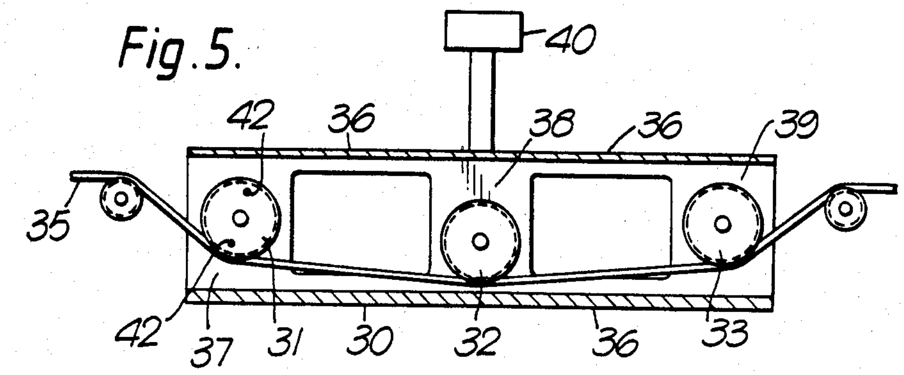
FIG. 5 is a load measuring device and rope speed and direction transmitter for use on the crane shown in FIG. 1.
Figure 6:
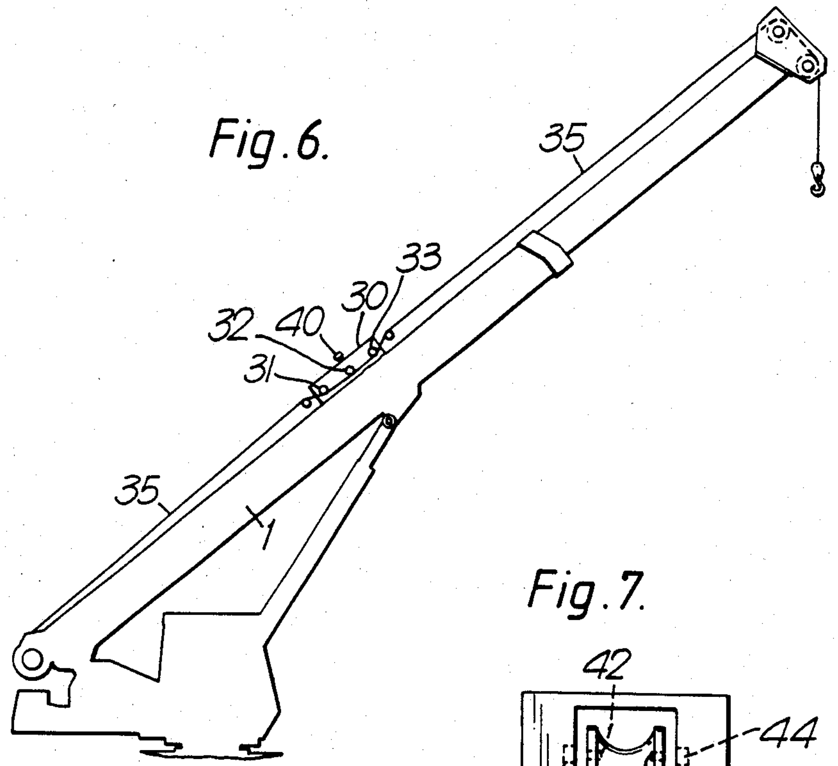
FIG. 6 shows the device and transmitter of FIG. 5 located on the crane of FIG. 1
Figure 7:
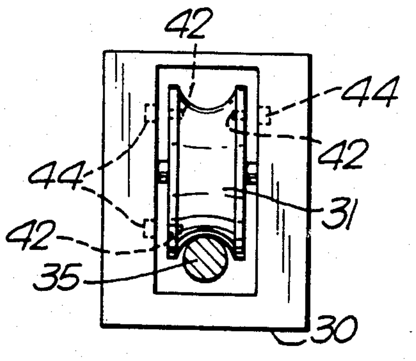
FIG. 7 is another view of the rope speed and direction transmitter of FIG. 5.

In order to transmit the rope motion one of the pulleys in this case pulley 31 is provided with permanent magnets 42 a pair of which are opposite each other in line parallel to the pulley axis and the third being located 180° away from the pair as seen in FIGS. 5 and 7. Sensors 44 are mounted on the unit 30 which digitally transmit pulley and hence rope motion to the microprocessor. Sensors 44, mounted to the frame, act as detector means and sense the presence of magnets 42 passing thereby. Magnets 42 indicate to sensors 44 the direction of movement of rope 35 as rope 35 passes along pulley 31.

Further facilities are available in the system of the invention and indeed the whole system has the advantage of accepting almost any range of data relevant to control, safety, maintenance, operational recording and operation of almost any type of crane.

A particular facility is the provisions of a bus interface on the microprocessor as shown in FIG. 2. This allows one or more programming cards to be linked to the system so that new safety regulations may be added, a recording for "black box" purposes that is for safety records can be constantly made and recording for planned maintenance can be constantly made.

A further facility is that since hoist rope movement, and actual jib head position is determined by the system it is simple to use this data to control servo system connected to slew hoist and jib elevation and length drives to achieve automatic luffing so that the crane operator can programme in the required destination of the load allowing the processor to control the relative movements of the different crane motions.

What is claimed is:

1. A dynamometer comprising:

a frame;

rope deflecting means, including a second rotatable member, mounted to said frame;

first and third rotatable members mounted to said frame on either side of said second rotatable member, said first and third rotatable members being out of alignment with said second rotatable member;

said frame including three mounting blocks, each block carrying one of said rotatable members and each block being connected to the other in line by a pair of resiliently flexible portions;

a rope, the tension of which is to be measured, rove past said first and third rotatable members and in bearing contact with said second rotatable member to be deflected by said second rotatable member;

a load cell mounted to said frame and arranged to measure the deflection force of said rope against said second rotatable member; and wherein at least one of said rotatable members is provided with indicating means radially spaced from its axis, and wherein the frame is provided with detector means arranged to detect the passage of said indicating means past said detector means, said detector means being enabled to transmit at least the rope movement direction to a microprocessor.

2. A dynamometer as claimed in claim 1 wherein said frame is formed of an elastomer material.

3. A dynamometer for use in combination with a crane having a crane jib, a data processing system including a microprocessor and a crane hoist rope, the dynamometer comprising:

a frame mounted to the crane jib;

means for passing the rope through said frame;

a rotatable member provided with three indicating means radially spaced from its axis and positioned adjacent the outer periphery of said rotatable member, two said indicating means positioned along a first radial direction and a third indicating means positioned along a second radial direction different from said first radial direction, said rotatable member being mounted to said frame in bearing contact with the rope;

detector means, corresponding to each indicating means mounted to said frame in radial positions relative the rotor axis corresponding to said first and second radial directions, for detecting the direction of rotation of said rotatable member and transmitting a direction signal to the microprocessor;

force transducing means, operably coupled to the rope, for producing a load signal according to the tension on the rope; and means for modifying said load signal in accordance with the direction of said direction signal.

4. The dynamometer of claim 3 wherein said load signal is a digital signal, wherein said detector means feed digital signals corresponding to rope movement and direction to said microprocessor for conversion to rope movement, rope direction and rope speed indications by said microprocessor, and wherein said means for modifying said load signal is fed with said digital load signal and said digital direction signal.

5. The dynamometer of claim 3 wherein each indicating means comprises a permanent magnet.

6. A dynamometer for use in combination with a crane having a data processing system including a microprocessor and a crane hoist rope, the dynamometer comprising:

a frame;

deflecting means, including a second rotatable member bearing on the hoist rope, mounted to said frame for deflecting the hoist rope from a path, the hoist rope being under tension caused by a load;

a load cell mounted to said frame and arranged to measure a force across the hoist rope caused by said second rotatable member;

first and third rotatable members mounted to said frame, said second rotatable member being out of alignment with said first and third rotatable members and arranged and adapted to rotatably engage the hoist rope;

said frame comprising three mounting blocks, each block carrying one of said rotatable members and each block being connected in line by a pair of resiliently flexible members; and means for transmitting digital data corresponding to said measured force to the microprocessor.

7. A dynamometer as claimed in claim 6 wherein said frame is formed of an elastomer material.

8. A dynamometer as claimed in claim 6 wherein one of said rotatable members is provided with indicating means radially spaced from its axis and the frame is provided with detector means arranged to detect the passage of said indicating means past said detector means whereby speed and direction of the rotation of said one rotatable member may be detected, said detector means being arranged and adapted to transmit the speed and direction digitally to said microprocessor.

9. A dynamometer as claimed in claim 8 wherein said indicating means comprises at least one magnet.

10. A dynamometer as claimed in claim 9 wherein said indicating means comprises three permanent magnets positioned adjacent the outer periphery of said one rotatable member, two of said magnets positioned along a first radial direction and a third magnet positioned along a second radial direction, said second radial direction being different from said first radial direction.

11. In combination with a crane having a crane jib with a data processing system including a microprocessor, said jib having mounted thereto a dynamometer and a crane hoist rope rove through said dynamometer, said dynamometer comprising:

a frame, deflecting means mounted centrally to said frame, lead means mounted on said frame on either side of said deflecting means, said hoist rope rove past said lead means and deflected by said deflecting means, a load cell mounted to said frame and arranged to measure the deflection force caused by said deflecting means, transmitting means transmitting said deflection force measurement to said microprocessor, said lead means including a rotatable member engaged with said rope and arranged to be rotated thereby, at least three indicating means mounted to said rotatable member, radially spaced from said rotatable member's axis, two of said indicating means positioned at a first radial direction and a third indication means positioned at a second radial direction, said first and second directions being different, detector means arranged to detect the passage of said indicating means past said detector means and to generate a direction signal.

* * * * *